Dec. 11, 1962 W. C. PRAY 3,067,474
BELT FASTENER
Filed July 20, 1960
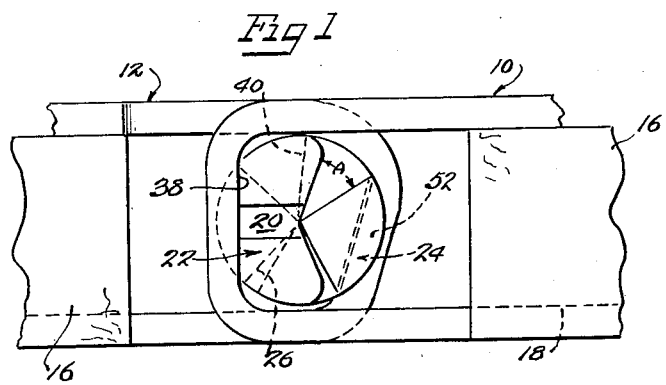
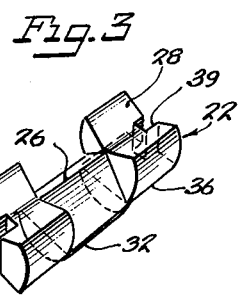
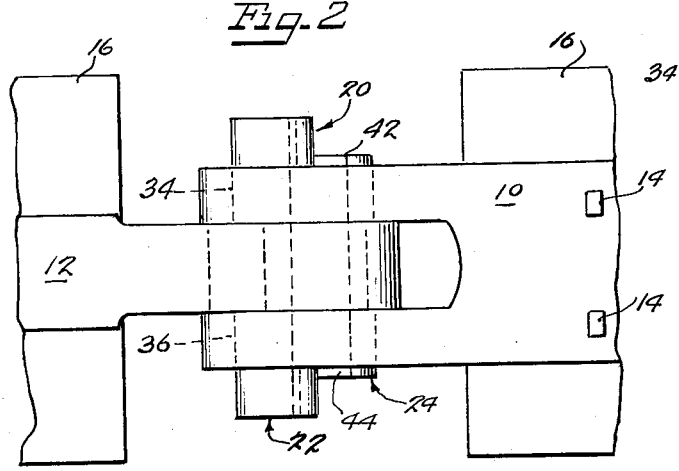
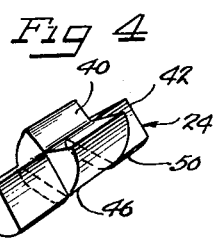
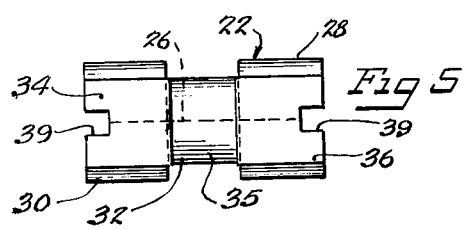
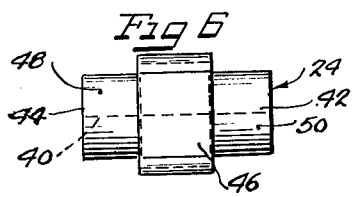
Inventor
WINSTON C PRAY
By Soans, Anderson, Luedeka & Fitch
Atty United States Patent Office 3,067,474
Patented Dec. 11, 1962

3,067,474
BELT FASTENER
Winston C. Pray, Lombard, Ill., assignor to Flexible Steel Lacing Company, a corporation of Illinois
Filed July 20, 1960, Ser. No. 44,129
2 Claims. (Cl. 24—33)

This invention relates to V-belt fasteners and is particularly directed to an improved form of V-belt fasteners of the flexible hinged type.

In the use of V-belt drives, it has been a problem to provide an economical and satisfactory type of hinge connection, which will not only be prevented from working out of place endwise, but which will also provide satisfactory flexing of the V-belt at the connection. Because of the nature of the operation of V-belts, it is necessary that the hinge connection be of less width than the V-belt and for many applications it is necessary that the hinge connection be made as economically as possible. Then too, it must be borne in mind that the connection must provide adequate flexing of the V-belt, particularly in its travel around the sheaves or pulleys supporting the driving belt.

It is a principal object of the present invention to provide a flexible V-belt fastener of the hinged type, which is simplified in construction and which provides proper flexing at the connection. A further object of the invention is to provide a flexible V-belt fastener of the type having a hinge pin comprising two mating elements which are adapted to rock relative to each other lengthwise of the hinge pin, wherein the path of said rocking movement is controlled to provide greater flexing of the fasteners in the direction of the center of the belt-supporting pulleys as the belt passes around the latter. Other objects and advantages will become apparent from the following description of a selected embodiment of the invention, which is made with respect to the accompanying drawings, wherein:

FIGURE 1 is a side view of a belt fastener including features of the invention;

FIGURE 2 is a top plan view of the fastener seen in FIGURE 1;

FIGURE 3 is a perspective view of one of the hinge elements;

FIGURE 4 is a perspective view of the complementary other hinge element;

FIGURE 5 is a rear view of the element seen in FIGURE 3; and

FIGURE 6 is a rear view of the element seen in FIGURE 4.

With reference particularly to FIGURES 1 and 2, it will be seen that the belt fastener comprises a pair of attaching members 10 and 12 of bail-like formation, with one of the members 10 having an apertured bight to provide a double loop at its outer end, and the other member 12 having a single loop that is adapted to extend in the apertured bight, between the spaced-apart double loops, on the other attaching member 10. These attaching members are suitably fastened, as by nails 14 or other suitable fastening means, on the ends 16 of the V-belt which are to be joined. Generally, the lower end of the attaching members are recessed in a groove or recess 18 on the side of the belt engaging the pulleys, in order to present a flat surface. The interfitting end portions of the attaching members are held in position relative to each other by means of a hinge pin 20 which comprises a pair of complementary elements 22 and 24 adapted to cooperate with each other in a manner providing for pivotal movement therebetween and, consequently, between the attaching members 10 and 12. Moreover, these hinge pin elements 22 and 24 are shaped to provide for locking engagement with the end loop portions of the respective attaching members 10 and 12, to prevent movement of the hinge pin 20 endwise when in its operative, belt fastening position. The tension on the ends of the V-belt is utilized in maintaining this locking relation between the hinge pin and the attaching members.

The rocker hinge pin assembly 20 is of a type similar to that shown in McComb Patent No. 2,851,753, which is assigned to the assignee of the present application, but the disclosed hinge pin has been modified, relative to the prior structure, to provide definite advantages which will be noted hereinafter. The hinge pin element 22, seen particularly in FIGURES 3 and 5, includes along its inner face a centrally located knife edge portion 26 which is disposed between two end portions 28 and 30 of re-entrant V-formation, with the apices of the V-sections 28 and 30 forming a straight line with the knife edge portion 26. The rear or outer surface 32 (FIGURE 5) of the knife edge section 26 is generally curved, while the rear or outer surfaces 34 and 36, respectively, of the V-formations 28 and 30 are generally flat. This enables the rocker pin element 22 to be disposed in the fastener assembly with the two flat surfaces 34 and 36 positioned against the generally vertically extending inner edges 38 (FIGURE 1) of the two loops of the attaching member 10. The curved outer surface of the center portion of the rocker pin thereby provides shoulder portions which prevent endwise movement of this element. Opposite ends of the element 22 are preferably provided with slots 39 to facilitate turning the hinge pin assembly to disengage it from the attaching members.

The complementary hinge pin element 24, seen particularly in FIGURE 4 and 6, includes at its center portion a re-entrant V-section 40 of slightly less length than the knife edge portion 26 of the other element 22, and the outer end portions 42 and 44 of the hinge pin element 24 are V-shaped to provide a pair of knife edge sections on opposite sides of the re-entrant V-section 40, with the apex of the latter being in line with the knife edges presented by the former. Thus it is seen that the element 24 is positionable with the re-entrant V-formation 40 engaging the knife edge 26 of the other element 22 and the knife edge sections 42 and 44, respectively, engaging the V-sections 28 and 30. As noted in FIGURE 1, the angles formed on the inner surface of the element 22 are sufficiently greater than those formed on the inner surface of the other element 24 to provide relative rocking movement therebetween when the two are disposed in engagement, as seen in FIGURE 1.

The outer surface 46 of the central portion of the element 24 is generally flat, while the outer surfaces 48 and 50, respectively, of the end sections 42 and 44 of this element are generally curved as indicated in FIGURE 6. This permits placement of the hinge pin element 24 in locking engagement with the single loop end of the attaching member 12, with the flat surface 46 engaging the loop end and the curved surfaces 48 and 50 providing shoulder portions to prevent endwise movement of the hinge pin element. In this respect, it will also be noted that the loop end of the single bail-type fastener 12 is not entirely arcuate, but includes a generally straight section 52 (FIGURE 1) which is inclined with respect to the vertical. This is the section which is engaged by the generally flat face 46 of the center portion of the element 24 seen in FIGURES 4 and 6, and is adapted to hold such element in position and prevent rotation of the element relative to the attaching member 12. Consequently, any flexing of the belt fastener assembly is provided for by the rocking movement of the other hinge element 22 and its associated fastener 10 about the axis of the re-entrant V-formation 40 at the center of the hinge pin element 24. Such rocking movement is generally through the angle indicated at "A" in FIGURE 1. Furthermore, the inclined positioning of the attaching member section 52 provides that such rocking movement be toward the bottom of the fastener element, that is, toward the center of the supporting drive pulleys. Consequently, the described arrangement not only provides for effectively locking the hinge pin elements against endwise movement during operation of the V-belt, but also directs the flexing of the fastener elements in the direction which is most advantageous, that is, toward the center of the supporting pulleys.

Although shown and described with respect to a particular embodiment, it will be apparent that various modifications might be made without departing from the principles of this invention.

I claim:

1. In a belt fastener comprising a pair of attaching members each of bail-like formation including a pair of spaced, generally parallel legs and a bight portion connecting said legs, the bight portion of at least one of said members having an aperture therein and the other of said members having its bight portion disposed in said aperture to provide an aligned transverse opening through the mated attaching members, and a hinge pin disposed in said opening to provide for relative rocking movement between said attaching members, said hinge pin comprising two elements, each of which is formed with internally facing knife edge and re-entrant V-formation portions formed alternately and contiguously lengthwise of the element, the knife edge and re-entrant V-formation portions of one element being staggered with respect to those of the other element to thereby provide a series of complemental but alternately disposed sets of contiguous, cooperable, rocking knife edge and re-entrant V-formations lengthwise of the hinge pin affording relative rocking movement therebetween and preventing axial displacement therebetween, the improvement comprising a generally arcuate outer surface formed on one of said hinge pin elements with a transversely recessed portion adjacent the center thereof, a generally arcuate outer surface formed on the other of said hinge pin elements with a flat surface portion adjacent each end portion thereof, the bight portion of said one attaching member being disposed generally normal to said parallel legs thereof and being engaged on opposite sides of the aperture therein by the flat outer surface portions of said other hinge pin element, and wherein the bight portion of said other attaching member is disposed in inclined relation to the parallel legs thereof and is engaged by said transversely recessed portion of said one hinge pin element.

2. In a belt fastener comprising a pair of attaching members each of bail-like formation including a pair of spaced, generally parallel legs and a bight portion connecting said legs, the bight portion of at least one of said members having an aperture therein and the other of said members having its bight portion disposed in said aperture to provide an aligned transverse opening through the mated attaching members, and a hinge pin disposed in said opening to provide for relative rocking movement between said attaching members, said hinge pin comprising two elements, each of which is formed with internally facing knife edge and re-entrant V-formation portions formed alternately and contiguously lengthwise of the element, the knife edge and re-entrant V-formation portions of one element being staggered with respect to those of the other element to thereby provide a series of complemental but alternately disposed sets of contiguous, cooperable, rocking knife edge and re-entrant V-formations lengthwise of the hinge pin affording relative rocking movement therebetween and preventing axial displacement therebetween, the improvement comprising a generally arcuate outer surface formed on one of said hinge pin elements with a transversely recessed portion adjacent the center thereof, a generally arcuate outer surface formed on the other of said hinge pin elements with a flat surface portion adjacent each end portion thereof, the bight portion of said one attaching member being disposed generally normal to said parallel legs thereof and being engaged on opposite sides of the aperture therein by the flat outer surface portions of said other hinge pin element, the bight portion of said other attaching member is disposed in inclined relation to the parallel legs thereof, and said inclined bight portion is engaged by said transversely recessed portion of said one hinge pin element to hold the latter in a position such that the knife edge and re-entrant V-formation portions of said one hinge pin are asymmetrically located with respect to the complemental knife edge and re-entrant V-formations of said other hinge pin, whereby greater rocking movement is provided between said hinge pin elements in one direction than in the other direction about the hinge pin axis.

References Cited in the file of this patent

UNITED STATES PATENTS

| | | |
|---|---|---|
| 1,837,210 | Diamond | Dec. 22, 1931 |
| 2,012,071 | Rhoades | Aug. 20, 1933 |
| 2,020,542 | Freedlander | Nov. 12, 1935 |
| 2,034,475 | Kremer | Mar. 17, 1936 |
| 2,145,455 | Olsen | Jan. 31, 1939 |
| 2,851,753 | McComb | Sept. 16, 1958 |